UNITED STATES PATENT OFFICE.

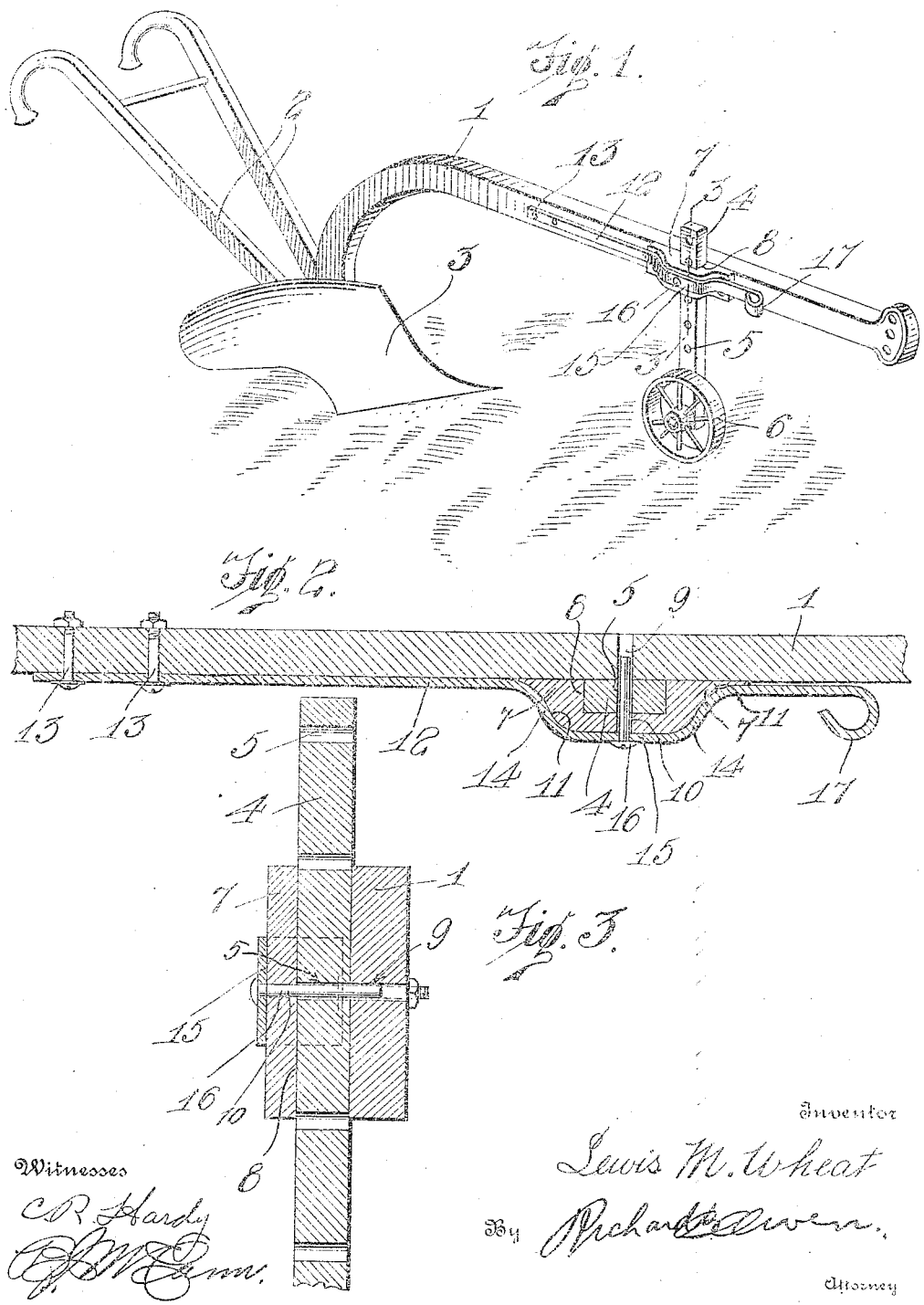

LEWIS M. WHEAT, OF LAKEMONT, NEW YORK.

PLOW ATTACHMENT.

1,230,964.  Specification of Letters Patent.  Patented June 26, 1917.

Application filed August 17, 1915. Serial No. 45,973.

*To all whom it may concern:*

Be it known that I, LEWIS M. WHEAT, citizen of the United States, residing at Lakemont, in the county of Yates and State of New York, have invented certain new and useful Improvements in Plow Attachments, of which the following is a specification.

My invention relates to a plow attachment, and more particularly to a depth regulating attachment therefor.

The primary object of my invention is to provide a depth regulating member for plows which is simple in construction, cheap to manufacture, strong and durable, and effective in operation.

Another object of my invention is to provide means on the beam of a plow having engagement with a supporting wheel shank, said shank being adjustable on said beam whereby to adjust the depth to which the plow is adapted to cut.

With the above and other objects in view my invention resides preferably in the construction, combination, and arrangement of parts as hereinafter set forth in the specification and illustrated in the accompanying drawings, in which—

Figure 1 is a perspective view of an ordinary plow showing my invention applied thereto.

Fig. 2 is a longitudinal sectional view through a plow beam showing my invention applied thereto.

Fig. 3 is a transverse sectional view taken on the line 3—3 of Fig. 1.

Similar reference characters indicate similar parts throughout the various views of the drawings.

In the drawings, wherein the preferred form of my invention is illustrated, the numeral 1 designates the plow beam having the usual handles 2 extending therefrom and the plow share 3 carried by said beam. The depth regulating member includes a frame comprising a shank 4 having a plurality of openings 5 therein. On the lower end of the shank 4 is mounted a wheel 6 which is adapted to run upon the ground. A yoke member comprising a block 7 is mounted on the beam 1 at a point substantially intermediate its length, said block having a recess 8 therein adapted to receive the shank 4. A pair of openings 9 and 10 are provided in the beam 1 and block 7, respectively, said openings being in alinement with the opening 5. Attention is called to the peculiar formation of the block 7, the opposite extremities thereof being irregularly curved as indicated at 11 for a purpose which will hereinafter appear.

The retaining element of my invention comprises a leaf or spring 12 having one end thereof secured to the beam 1 by bolts 13 and the opposite end thereof extended over and beyond the block 7. The spring 12 is offset intermediate its length as indicated at the points 14 to conform to the curved surfaces 11 of the block 7, said offset portions 14 affording a relatively short straight portion 15, intermediate of which is mounted rigidly a pin 16, said pin being adapted for reception in the openings 5, 9, and 10, whereby to retain the shank 4 in a desired position. The free extremity of the spring 12 is curved upon itself as indicated at 17 to provide a finger engaging portion to facilitate releasing of the device.

When it is desired to adjust the shank 4 to any desired height, the spring 12 is moved to a point remote from the block 7, thereby withdrawing the pin 16 from engagement with said shank. The shank may now be moved upwardly or downwardly as may be desired and the strip released causing the pin to engage said shank and retain the same in the position desired. It will be noted that when the spring 12 is in normal position, the offset portions thereof embrace the block thereby tending toward a rigidity of construction and assisting in preventing lateral strains on said spring 12.

While I have shown and described my invention as possessing a peculiar form and construction, it is desired that it be understood that I may make such changes in the details thereof that do not depart from the spirit and scope of the invention as claimed.

Having thus described my invention, what I claim and desire to secure by Letters Patent is:

1. A plow beam having an opening, a guide-way secured to the beam and having a co-axial opening, an apertured shank movable in the guide-way, a gage wheel at the lower end of the shank, a strap spring secured to the plow beam and having a pin engageable with the openings in the guide-way and beam and one of the apertures in the shank, said spring conforming to the shape of the guide-way and provided with a finger piece.

2. A plow beam having an opening, a guide-way secured laterally of the beam and having a transverse co-axial opening, an apertured shank movable in the guide-way, a gagewheel at the lower end of the shank, a strap spring secured to the side of the plow beam and having a pin engageable with the openings in the guide-way and the beam and one of the apertures in the shank, said spring conforming to the shape of the guide-way and provided with a finger-piece.

In testimony whereof I affix my signature in presence of two witnesses.

LEWIS M. WHEAT.

Witnesses:
A. H. CLAPPER,
ETTA S. CLAPPER.

Copies of this patent may be obtained for five cents each, by addressing the "Commissioner of Patents, Washington, D. C."